US006629939B2

(12) United States Patent
Jikiba et al.

(10) Patent No.: US 6,629,939 B2
(45) Date of Patent: Oct. 7, 2003

(54) MASSAGE CHAIR

(75) Inventors: Yasuhiro Jikiba, Kasai (JP); Hideki Sakata, Kasai (JP); Masao Kume, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 97 days.

(21) Appl. No.: 09/993,379

(22) Filed: Nov. 14, 2001

(65) Prior Publication Data

US 2002/0082534 A1 Jun. 27, 2002

(30) Foreign Application Priority Data

Nov. 15, 2000 (JP) ........................................ 2000-347523

(51) Int. Cl.⁷ .............................................. A61H 15/00
(52) U.S. Cl. ........................... 601/99; 601/100; 601/102
(58) Field of Search .............................. 601/86, 90, 98, 601/99, 100, 101, 102, 103, 116, 117

(56) References Cited

U.S. PATENT DOCUMENTS

| 4,422,449 | A | * | 12/1983 | Hamabe ...................... 601/99 |
| 6,039,705 | A | * | 3/2000 | Wu .............................. 601/99 |
| 6,117,094 | A | * | 9/2000 | Fujii ............................ 601/99 |
| 6,224,563 | B1 | * | 5/2001 | Nonoue et al. ............... 601/99 |
| 6,443,917 | B1 | * | 9/2002 | Canto .......................... 601/99 |
| 6,511,448 | B1 | * | 1/2003 | Furuie et al. ............... 601/101 |

FOREIGN PATENT DOCUMENTS

| EP | 0 832 634 A | 4/1998 | .......... A61H/15/00 |
| JP | 05031147 | 2/1993 | ............ A61H/7/00 |
| JP | 09299424 | 11/1997 | ............ A61H/7/00 |

* cited by examiner

*Primary Examiner*—Danton D. DeMille
*Assistant Examiner*—Quang D Thanh
(74) *Attorney, Agent, or Firm*—Darby & Darby

(57) ABSTRACT

A massage unit of a massage device moves upward and downward along a backrest of a chair. A pair of therapeutic arms are pivotably supported on a pair of pivot arms projecting forward when viewed from the backrest. Therapeutic fingers on the therapeutic arms have massage balls disposed on them. The pivot arms are driven to move the therapeutic arms in three dimensions, i.e., up and down, left and right, forward and back, so that a patient is massaged by the massage balls. An angle detector detects the angle of the therapeutic arms relative to the pivot arms. The magnitude and change in the output of the detector is used to determine the portion of the patient's body that is being contacted by the massage balls at any time.

13 Claims, 8 Drawing Sheets

MASSAGE CHAIR

BACKGROUND OF THE INVENTION

The present invention relates to a massage chair. More specifically, the present invention relates to a massage chair that can detect a position on a patient with which a therapeutic finger is in contact.

Referring to FIGS. 1 and 2, a massage device 10 allows a patient to receive a massage from the neck to the shoulder, back, and hips. The massage device 10 includes a chair 11 having a backrest 13. A massage unit 30 in the backrest 13 can be raised and lowered. The present invention relates to the massage device 10. With the exception of the massage unit 30, the massage device 10 is the same as conventional technology.

The massage unit 30 is attached by rollers 31,31 to guide rails 18 disposed in the backrest 13. A motor 21 rotates a threaded shaft 22 to move the massage unit 30 up and down in the backrest 13.

Left and right pivot arms 43, 43 project from the massage unit 30. The pivot arms can move three-dimensionally, i.e., left and right, up and down, and forward and back. Therapeutic arms 42, 42 are pivotably supported at the ends of the pivot arms 43, 43. Upper and lower massage balls 41, 41 are disposed at the free ends of the therapeutic arms 42, 42. Each therapeutic arm 42 is biased by a spring 82 so that its upper massage ball 41 projects forward.

In the massage device 10 described above, the pivot arms 43, 43 are driven, and the massage unit 30 is raised and lowered while the left and right massage balls 41 are brought together and apart. This provides a rolling massage for the entire upper body of the patient from the shoulders to the back to the hips. Alternatively, the massage unit 30 can be raised and lowered or stopped at a position desired by the patient to provide a localized massage. Also, some massage devices provide automatic programmed massages that combine these two types of massages.

When performing rolling massage of the upper body, the massage unit 30 moves back and forth between the shoulder and the hips of the patient. This requires the shoulder position of the patient to be detected.

Also, to provide a localized massage by moving the massage unit 30 to a position desired by the patient, e.g., shoulders, back, hips, it is necessary to detect the height of the patient's shoulders, back, or hips.

The positions of shoulders, backs, and hips vary from patient to patient. Also, the positions can change even in the same patient depending on the posture in the chair. Thus, if the position of the patient's shoulders or the like is not accurately detected, a position different from the desired position will be massaged. This can lead to reduced effectiveness in the massage as well as to discomfort.

Thus, a massage device is available that allows the shoulder position to be set up manually by the patient. However, setting up the shoulder position manually is inconvenient. Also, as described above, the shoulder height can vary depending on posture. Thus, settings must be made both when a different patient sits down as well as when the same patient sits down at a different time, or when a patient changes his or her posture. This is very inconvenient.

Japanese laid-open patent publication number 6-190012 A61H7/00 discloses a massage device that automatically performs shoulder position detection. In this massage device, pressure detecting means not shown in the figures are provided on the massage balls or arms. When the massage unit is at the upper section of the backrest 13, i.e., when the massage balls 41 are out of contact with the patient, pressure detecting means are roughly in an unloaded state. When the massage unit 30 is lowered and the massage balls 41 come into contact with the shoulders of the patient, a load is applied to the massage balls 41.

Prior to the massage operation, the massage unit 30 is lowered from the uppermost position of the backrest 13 and the load on the massage balls 41 is detected to determine the shoulder position.

In this massage device, once the shoulder position is detected, the back and hip positions are determined based on the shoulder position and the distance from the seat 12, which serves as a reference position. In other words, detection of back and hip positions requires that the shoulder position be detected first. It is possible for the patient to use the massage device while sitting on a cushion or the like. In such cases, the height of the seat 12, which serves as a reference position, changes, but there is no mechanism to detect this. Thus, even if the shoulder position can be determined, the back and hip positions cannot be determined accurately.

Furthermore, if the patient changes posture or shifts in the chair, the massage position must be redetected, but this requires raising the massage unit and re-detecting the shoulder position. Thus, real-time detection of massage positions is not possible, particularly for localized rolling massages on the hips and back.

Also, the disclosed massage device detects shoulder position using pressure detecting means. This detection requires that the massage unit first be raised while maintaining a fixed amount of protrusion for the massage balls 41. During the detection operation, the patient must remain seated without moving.

OBJECTS AND SUMMARY OF THE INVENTION

The object of the present invention is to provide a massage device that overcomes the drawbacks of the prior art.

It is a further object of the invention to provide a massage device that can perform massaging based on the body of the patient by determining massage positions on the patient not only for the shoulder position but also for the positions of the back and hips.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
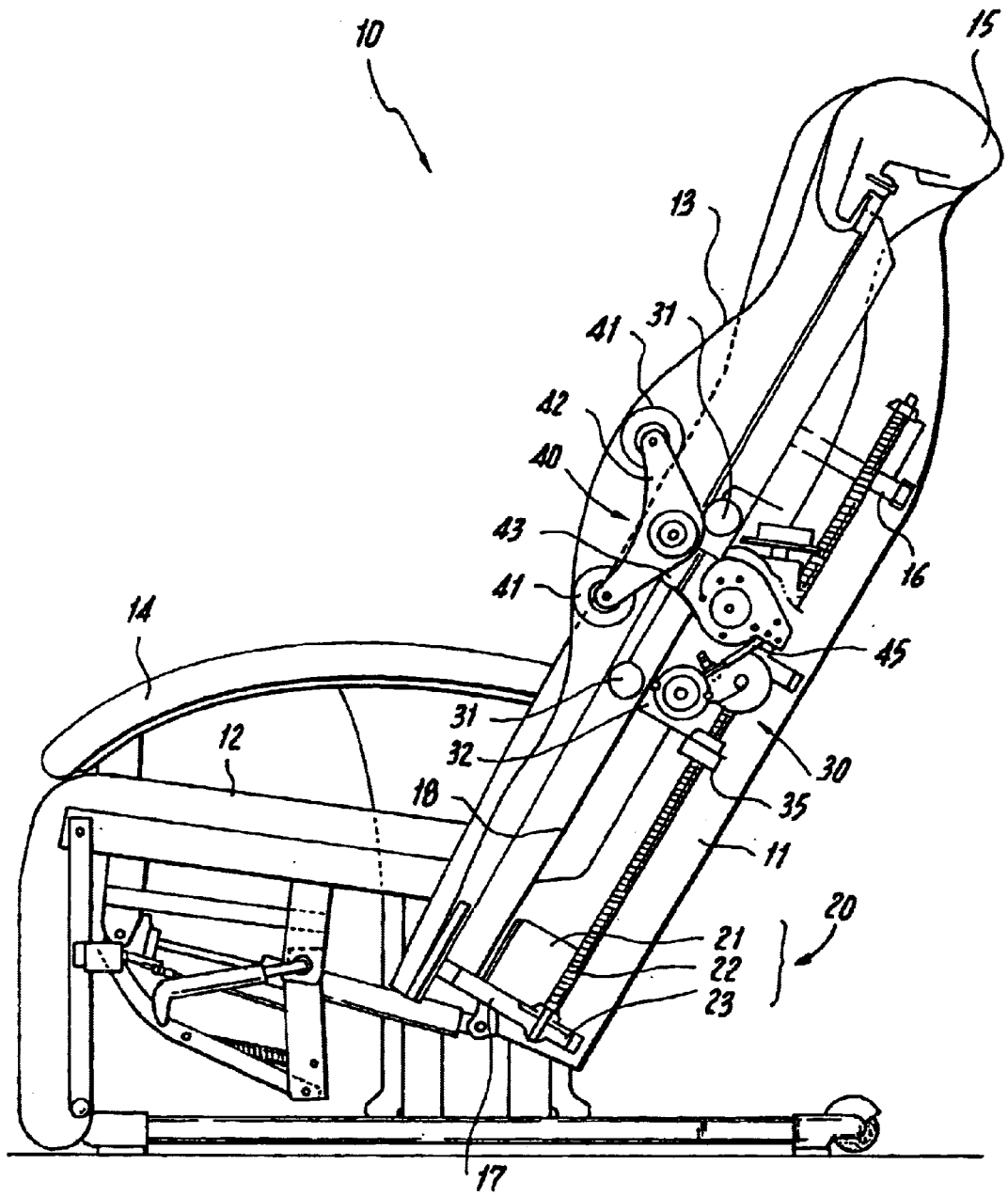
FIG. 1 is a cross-section drawing of a massage chair.
Figure 2:
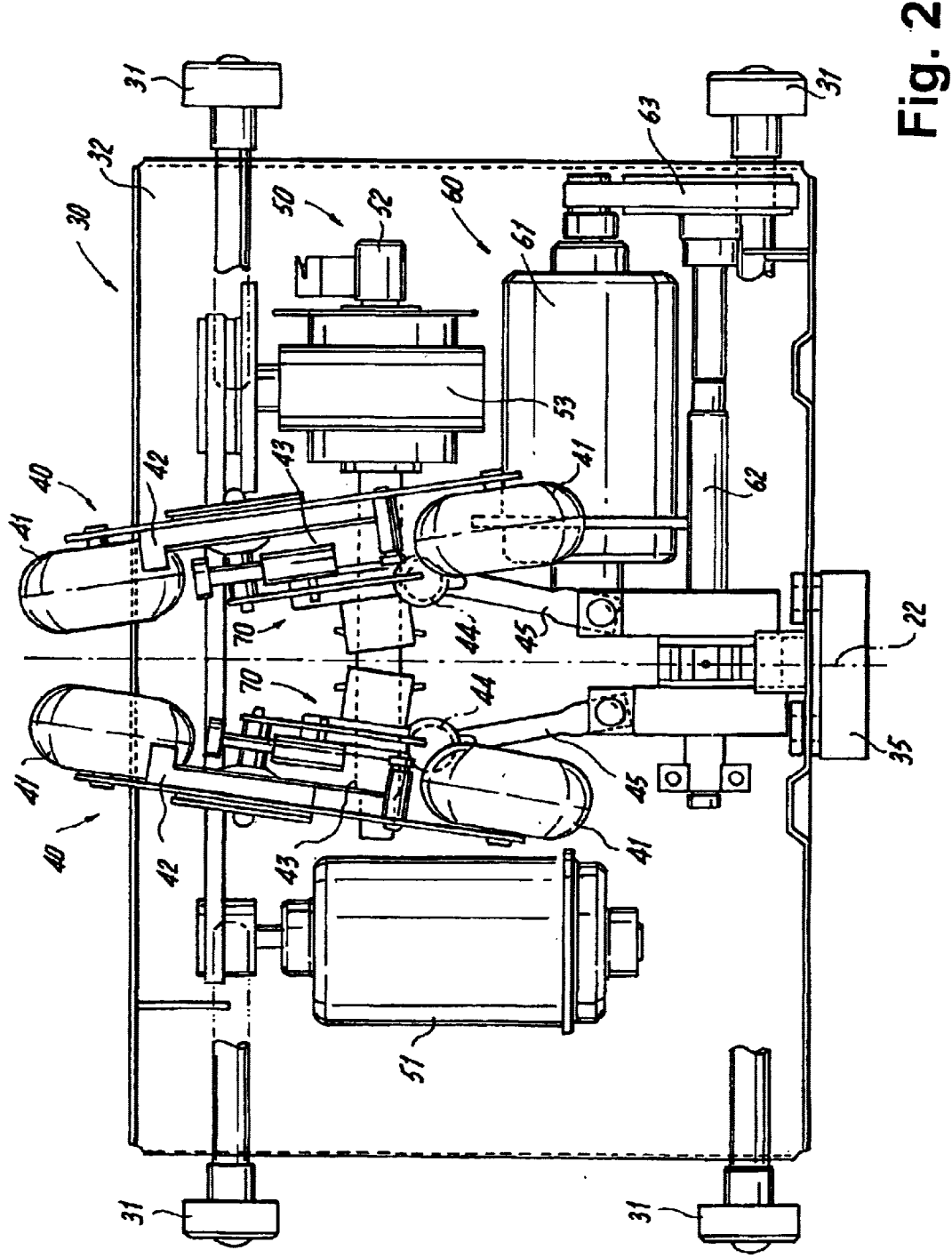
FIG. 2 is a front-view drawing of a massage unit according to the present invention.

Referring to FIGS. 1 and 2, a massage device 10 includes a massage unit 30 can be raised and lowered along a backrest 13 of a chair 11. A pair of therapeutic arms 42, 42 are pivotably supported on a pair of pivot arms 43, 43 projecting forward when viewed from the backrest 13. Therapeutic fingers 40, 40 are disposed on the therapeutic arms 42, 42. Massage balls 41, 41 are rotatably mounted on the therapeutic fingers 40, 40. The pivot arms 43, 43 are driven to move the therapeutic arms 42, 42 in three dimensions, i.e., up and down, left and right, forward and back, so that a patient receives a massage from the massage balls 41, 41. The massage chair 10 includes angle detecting means 70 detecting changes in an angle of the therapeutic arms 42, 42 relative to the pivot arms 43, 43.

It is also desirable to include a detection circuit 90 (FIG. 7) which, when a massage operation is taking place, detects a massaged position at which the massage balls 41, 41 come into contact with the patient based on an angle change of the therapeutic arms 42, 42 relative to the pivot arms 43, 43 detected by the angle detecting means 70. In this case, the detection circuit 90 stores pre-measured angles and angle changes of the therapeutic arm 42 relative to the pivot arm 43 based on massage positions. The measured angles and angle changes are compared with the stored data to identify massage positions.

In the massage device 10 according to the present invention, angle detecting means 70 detects rotational angle changes of the therapeutic arm 42 relative to the pivot arm 43. The angle of the therapeutic arm 42 relative to the pivot arm 43 changes depending on whether the massage ball 41 is out of in contact with the patient or is in contact with the shoulders, back, or hips. Thus, by measuring the angle changes in the arms 42, 43, the detection circuit 90 determines the position of the massage ball 41 in real time.

Since detection of the massage position does not require a reference position, i.e., the shoulder position or the seat, there is no need to raise the massage unit 30 to the shoulder position to detect massage position as in the conventional technology.

Referring now specifically to FIG. 1, the chair 11 includes a seat 12 on which a patient is seated. The backrest 13 extends upward from the rear of the seat 12. Armrests 14 are supported along the left and right sides of the seat 12. The seat 12, the backrest 13, and the armrests 14 are internally formed and supported by connected metal pipes, frames, plates, and the like. These elements are surrounded by cushioning and covers.

An upper frame 16 and a lower frame 17 are disposed inside the backrest 13. The ends of the upper and lower frames 16 and 17 are connected by a pair of guide rails 18 extending generally vertically parallel to each other. Because the backrest 13 may be tilted forward and backward, the term "vertically" is only a relative term, and should not be treated literally. The upper ends of the guide rails 18 extend upward past the upper frame 16 where they are attached to a headrest 15 on which the patient may place his/her head. The lower sections of the guide rails 18 are pivotably supported by the frame of the seat 12.

The guide rails 18, 18 are formed with a C-shaped cross-section with the concave portions facing each other. The massage unit 30 is attached along the guide rails 18, 18 to allow raising and lowering.

Raising/lowering means 20 is disposed inside the backrest 13. Raising/lowering means 20 includes the threaded shaft 22 supported parallel to the guide rails 18. A raising/lowering motor 21 rotates the threaded shaft 22. A pulley 23 is disposed at the lower end of the threaded shaft 22. The pulley 23 is connected to the shaft of the raising/lowering motor 21 by a belt. When the raising/lowering motor 21 is activated, the threaded shaft 22 rotates forward or in reverse.

Referring to FIG. 1 and FIG. 2, the massage unit 30 includes a chassis 32 supported by two pairs of rollers 31, one pair on each side. The two rollers 31 on each side fit into the concave groove of the guide rail 18 on its respective side. The chassis 32 includes a threaded cylinder 35 meshing with the threaded shaft 22. When the threaded shaft 22 is rotated as described above, the massage unit 30 is raised or lowered by the screw action. A pair of treatment fingers 40, 40 in the massaging means 50 together with a striking means 60, activating the treatment fingers 40, 40, are moved up and down with the massage unit 30. The chassis 32 is supported by rollers 31, 31 31, 31 fitting, two on each side, into the grooves of the guide rails 18.

The treatment fingers 40, 40 include pairs of massaging balls 41, 41 (or wheels) at the upper and lower ends of a flat therapeutic arm 42. The therapeutic arm 42 is bent at an angle at roughly its center. A flat pivot arm 43 is supported at the bent section of the therapeutic arm 42. The angle detecting means 70 is disposed between the therapeutic arm 42 and the pivot arm 43 to measure changes in the angle of the therapeutic arm 42 relative to the pivot arm 43.

The pivot arm 43 is pivotably supported on massaging means 50 (FIG. 2). The rear end of the pivot arm 43 is attached to a connecting rod 45 by a ball joint 44. This connecting rod 45 is connected to the striking means 60.

The massaging means 50 includes a massage shaft 52 pivotably supporting the sloped pivot arms 43, 43. A massage motor 51 rotates the massage shaft 52 through a reduction mechanism 53. Connection of the pivot arms 43, 43 to the connecting rods 45, 45 prevents rotation. When the massage shaft 52 rotates, the therapeutic arms 42, 42 move to the left and right, causing the massage balls 41, 41 to move in a reciprocating motion toward and away from each other, thereby providing a massaging action.

The striking means 60 includes a striking shaft 62 supporting the connecting rods 45, 45 of the treatment fingers 40, 40 with that the axes of the striking shaft 62 offset 180 degrees from each other. A striking motor 61 rotates the striking shaft 62 through a reduction mechanism 63.

When the striking motor 61 rotates, the connecting rods 45, 45 connected eccentrically to the striking shaft 62 move the treatment fingers 40, 40 move vertically in a reciprocating manner to provide a striking action.

Figure 3:
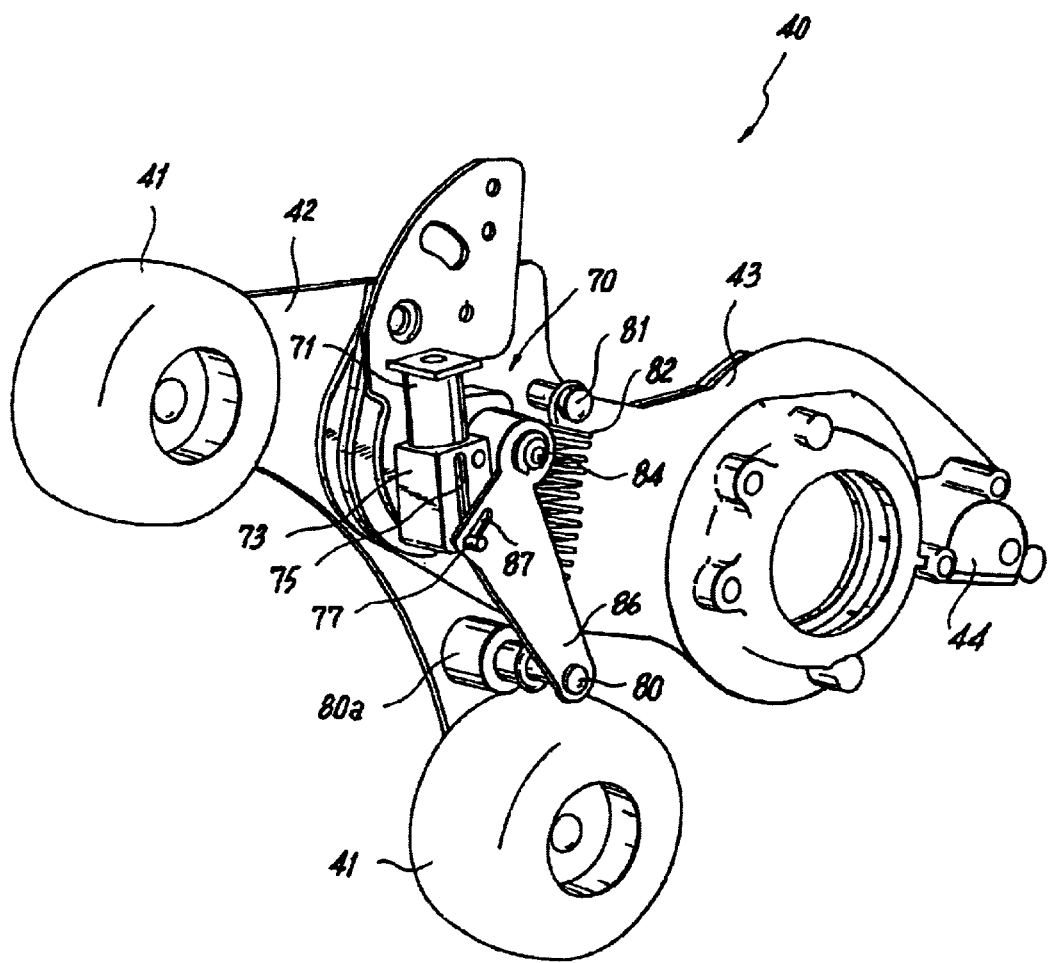
FIG. 3 is a perspective detail drawing of a therapeutic finger from the present invention where a therapeutic arm is tilted forward.
Figure 4:
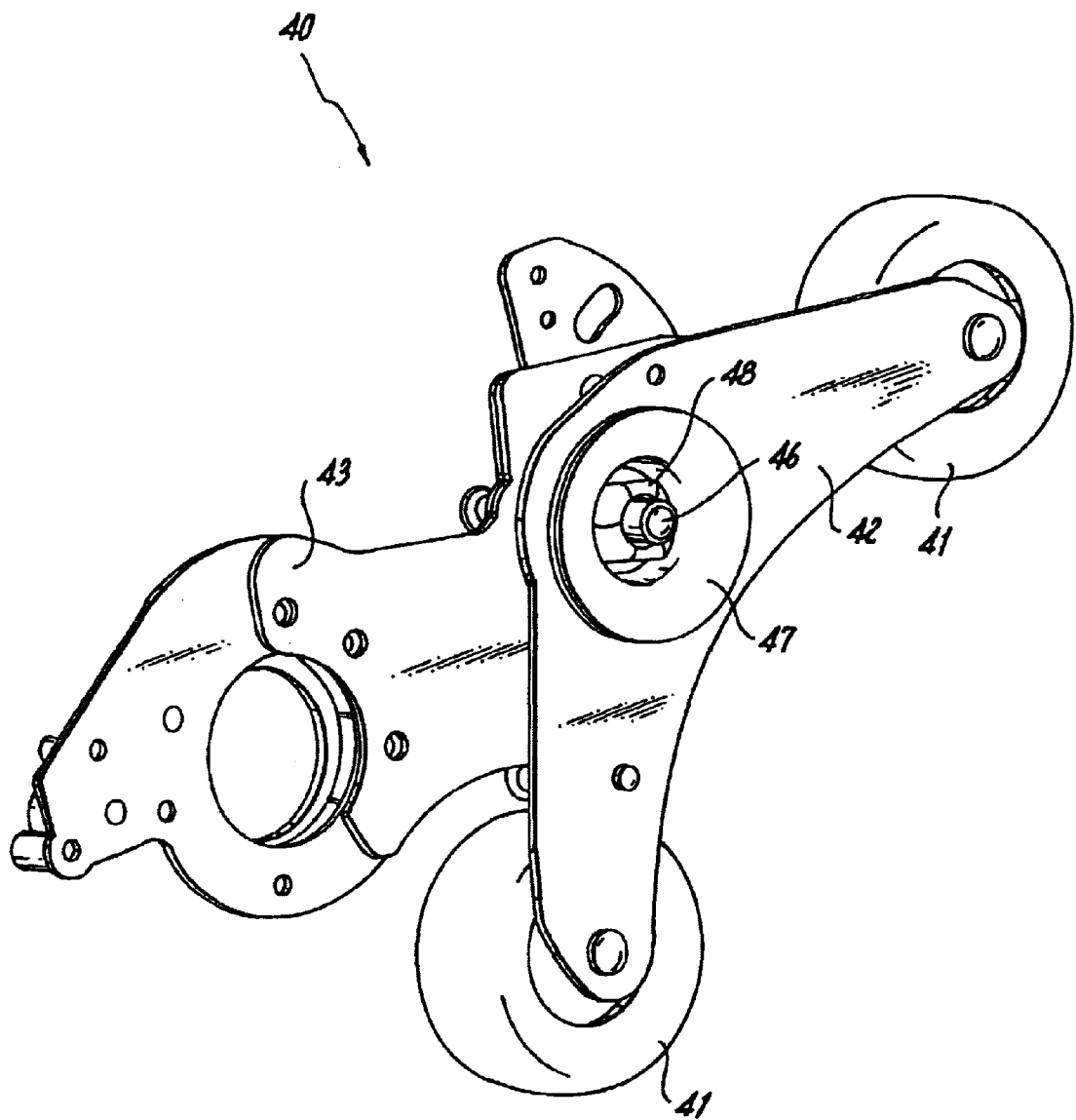
FIG. 4 is a perspective drawing of FIG. 3 as seen from the opposite side.

Referring now to FIGS. 2–4, the treatment finger 40 includes the pivot arm 43 connected to the massage shaft 52 and the striking shaft 62. The therapeutic arm 42, with its bend, is supported on the end of the pivot arm 43. The massaging balls 41, 41 are supported at the upper and lower ends of the therapeutic arm 42.

The therapeutic arm 42 is rotatably attached to the pivot arm 42 is rotatably attached by a bolt 46 through a resin bearing 47. A nut 48 on bolt 46 secures the therapeutic arm 42 to the pivot arm 43, while permitting relative rotation therebetween.

As best seen in FIG. 3, pins 80, 81 project from the therapeutic arm 42 and the pivot arm 43. The coiled spring 82 extending between the pins 80, 81 urges the upper massaging ball 41 toward a forward position.

An elastic rubber piece 80a is fitted to the pin 80 on the therapeutic arm 42. The elastic rubber piece 80a is a stopper to keep the therapeutic arm 42 oriented in a forward slope by abutting the pivot arm 43.

The present invention includes angle detecting means 70 for detecting changes in the angle of the therapeutic arm 42 relative to the pivot arm 43. Angle detecting means 70 determines the positions on the body of the patient at which the massage balls 41, 41 come into contact.

Angle detecting means 70 can be formed from any convenient mechanism in which an output value or output waveform of voltage, current, resistance, or the like varies according to the relative rotation of the arms 42, 43.

Figure 6:
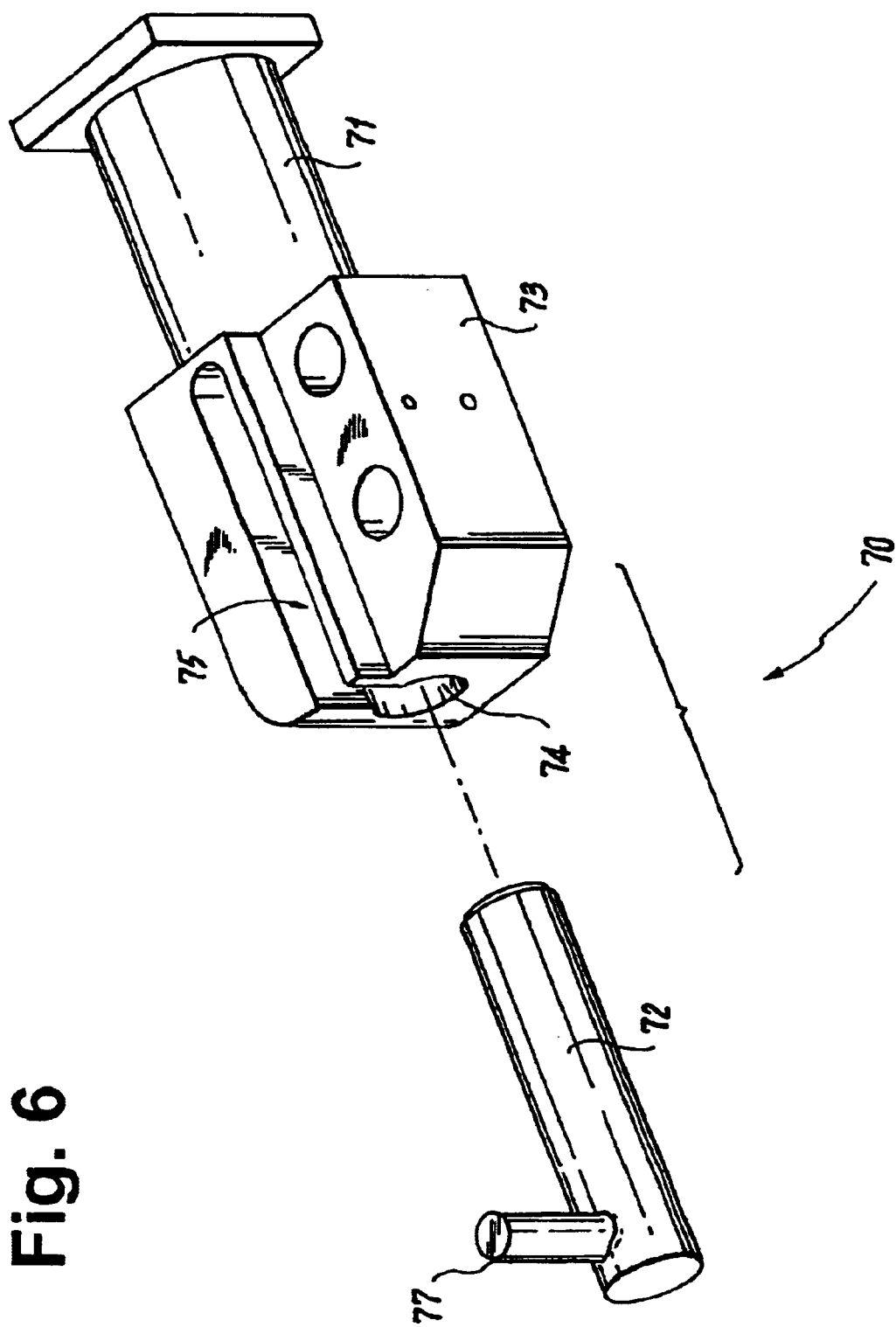
FIG. 6 is an exploded diagram of angle detecting means.

In the following description, angle detecting means 70 employs changes in inductance as a measure of the angle. Referring now also to FIG. 6, the angle detecting means 70 includes a cylindrical coil 71 and a magnetic core 72 moving in and out from the coil 71. When the therapeutic arm 42 rotates, the magnetic core 72 moves into and out of the coil 71, thereby changing the coil inductance which is then used to detect angle changes.

The coil 71 is formed from a conductor wrapped around a cylindrical portion of a coil bobbin 73 disposed on the pivot arm 43. The coil 71 is wrapped around the upper cylindrical section of the bobbin 73. The bobbin 73 includes a guide hole 74 at its lower section which slidably guiding the magnetic core 72 in and out. A guide groove 75 extends through the bobbin 73 from the guide hole 74. A guide pin 77, projecting from the magnetic core 72, rides loosely in the guide groove 75 to control rotation of the magnetic core 72, while still permitting longitudinal motion thereof. The guide hole 74 extended longitudinally in the bobbin 73, as well as the inside of the coil 71.

Returning now to FIGS. 3 and 4, a pin shaft 84 projects perpendicularly roughly coaxial with the support bolt 46 in the pivot arm 43. The pin shaft 84 and the pin 80 of the therapeutic arm 42 are connected by an operating plate 86. The operating plate 86 is rotatably fitted to the pin shaft 84 and the pin 80.

The operating plate 86 includes a slot 87 directed perpendicular to the radial direction of the pin shaft 84. The guide pin 77 of the magnetic core 72 is slidably fitted in the slot 87.

Figure 5:
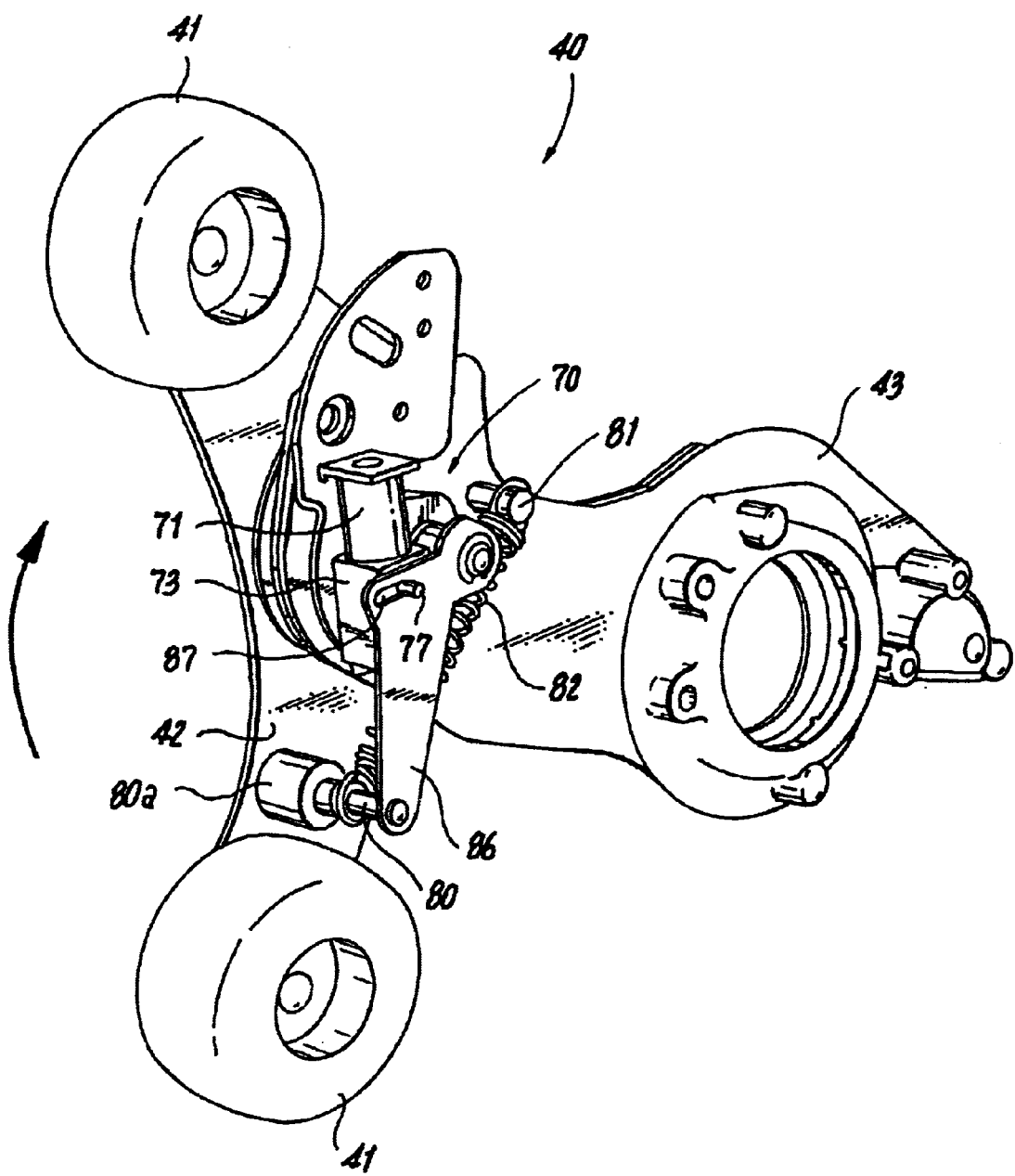
FIG. 5 is a perspective detail drawing of a therapeutic finger from the present invention where a therapeutic arm is roughly perpendicular.

Referring now to FIG. 3, when the therapeutic arm 42 tilts forward, the bobbin 73 is rotated to a position with respect to the pivot arm 43 at which the magnetic core 72, fitted in the guide hole 74, is withdrawn from the coil 71. Referring now to FIG. 5, when the upper and lower massage balls 41 of the therapeutic arm 42 are lined up roughly perpendicular, the guide pin 77 reaches the vicinity of the upper end of the guide groove 75. At this point, the magnetic core 72 enters the coil 71.

Going from FIG. 3 to FIG. 5, when the therapeutic arm 42 pivots relative to the pivot arm 43 so that when the upper and lower massage balls 41 are lined up roughly perpendicular, the operating plate 86 rotates along with the therapeutic arm 42, the guide pin 77 slides in the slot 87. At this time, the magnetic core 72 enters the coil 71. Conversely, going from FIG. 5 to FIG. 3, the pull from the spring 82 causes the therapeutic arm 42 to be restored in the direction of its forwardly tilted position. This slides the magnetic core 72 in the direction of disengagement from the coil 71.

Thus, the magnetic core 72 moves in and out of the coil 71 as the therapeutic arm 42 rotates relative to the pivot arm 43.

Figure 7:
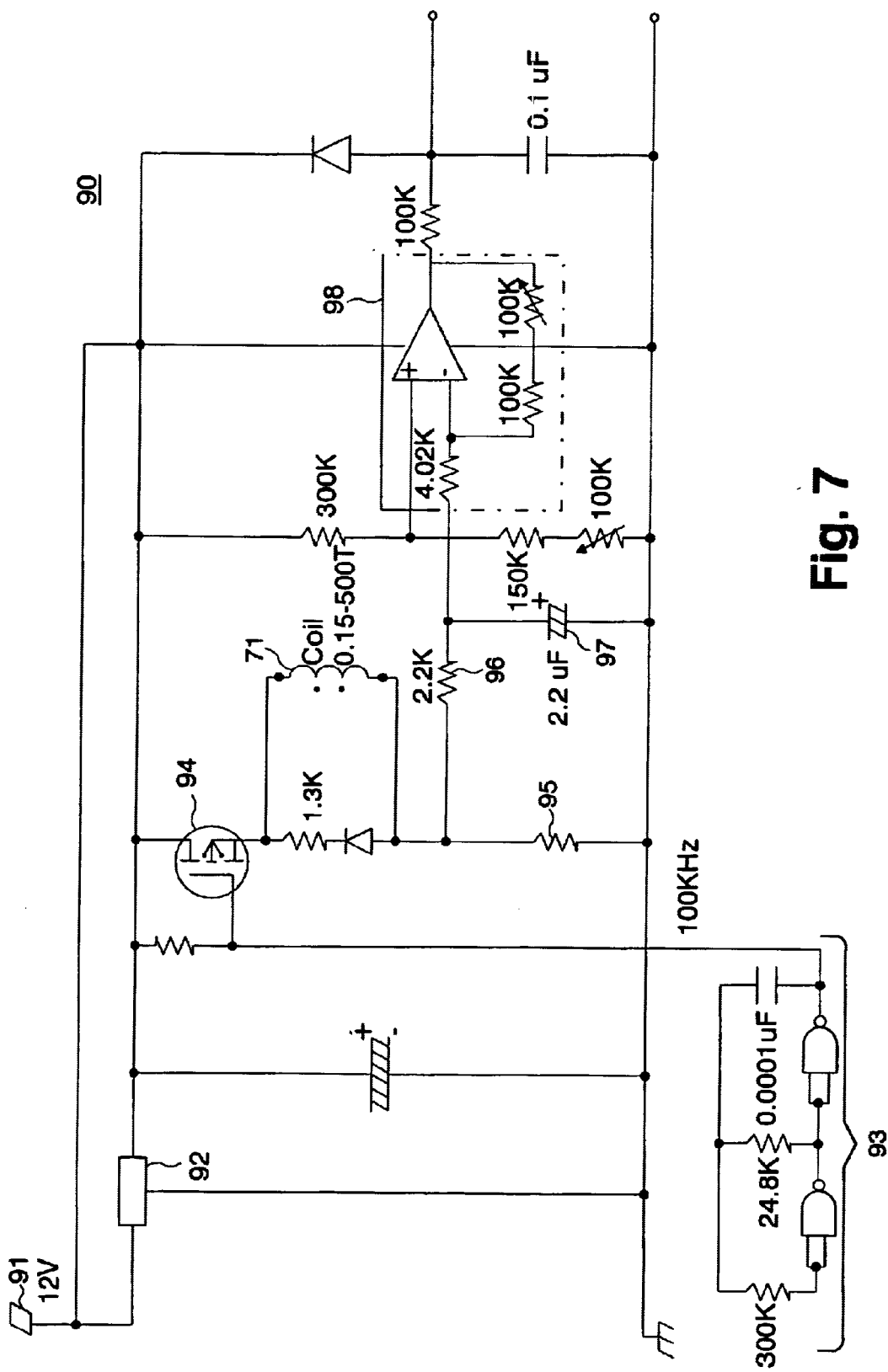
FIG. 7 is a circuit diagram of a detection circuit.

Referring to FIG. 7, a constant-voltage IC 92 in the detection circuit 90 converts a 12V from a smooth power supply 91 into a constant 5 V volts. An oscillator circuit 93 generates a 100 kHz pulse train that is sent to a transistor 94. The transistor 94 is turned on and off at 100 kHz. The resulting alternation of the transistor 94 between on and off is connected from the emitter of the transistor 94 to the coil 71. A resistor 95 is connected from a terminal of the coil 71 to ground. When the inductance of the coil 71 changes as a result of the changing current therethrough, the peak voltage of the pulse train flowing through the resistor 95 changes. The peak voltage is smoothed by a resistor 96 and a capacitor 97 and amplified by a differential amplifier circuit 98 to provide an output voltage.

An output voltage waveform is obtained from the detection circuit 90 while the massage motor 51 is rotating and massaging is taking place. The output voltage waveform is a characteristic shape depending on the area of the patient's body with which the massage balls 41 are in contact.

Figure 8:
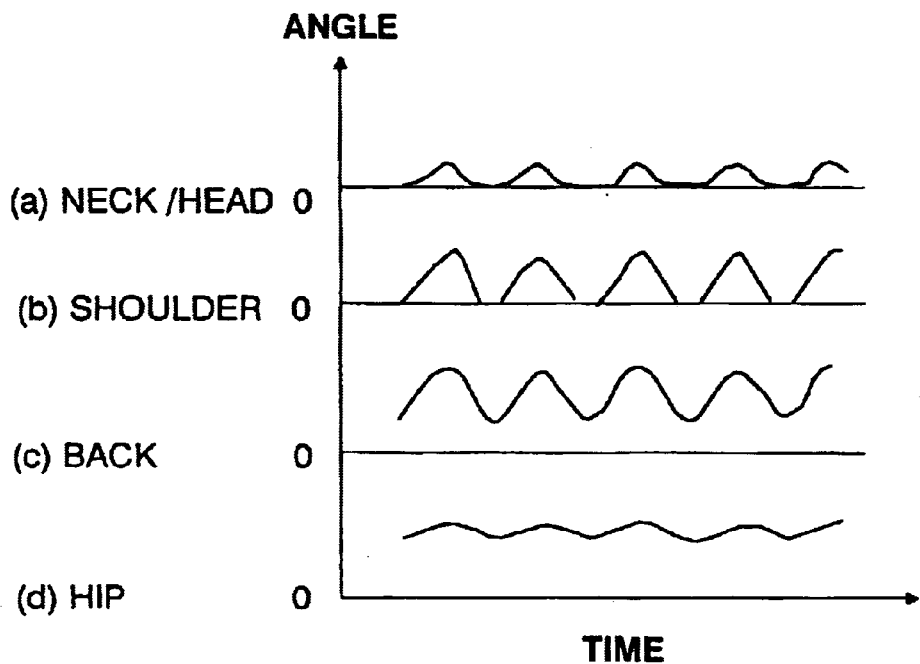
FIGS. 8 (*a*) through (*d*) are graphs that show angles and angle changes of a therapeutic arm relative to a pivot arm as detected for different positions.

Referring to FIG. 8, by comparing the output voltage waveform with waveforms stored ahead of time, changes in the angle of the therapeutic arm 42 relative to the pivot arm 43 can be detected. Referring to FIG. 8, the value of 0 (zero) degrees occurs when the therapeutic arm 42 is tilted the furthest forward.

For example, if the massage ball 41 is in contact with the neck or head of the patient, the output waveform shown in (a), having a low peak is detected. The waveform in (a) is characterized by a small angle change.

The waveform in (b) is produced when the massage ball 41 is in contact with the shoulder. Contact with the edge of the shoulder causes the upper massage ball 41 to be pushed back, resulting in a large angle change in the therapeutic arm 42.

The waveform in (c) is produced when the massage ball 41 in contact with the back. The rotation angle change and the angle formed by the arms 42, 43 are increased, and the angle changes significantly. A large angle is formed between the arms 42, 43 because the massage balls 41, 41 are raised up to be almost perpendicular, and the angle change is large because the patient is pushed so that the body is tilted forward when the back receives pressure from the massage balls 41, 41. As a result, the restorative force of the spring 82 attempts to return the therapeutic arm 42 back to its forward tilting state.

The waveform in (d) is produced when the massage ball 41 is in contact with the hip. In this case, the angle formed between the arms 42, 43 is large but the angle change is small. A large angle is formed between the arms 42, 43 because the massage balls 41, 41 are raised up to a position almost perpendicular while the massage is being performed. The angle change is small because pressure on the hip from the massage ball 41 is too small to force the patient to lean forward.

As described above, the changes and/or average values in the output waveform are used to identify the posture of the patient in real time.

The detection operation described above can be performed both while massaging is taking place without the raising or lowering of the massage unit 30 and while the massage unit 30 is being raised and lowered to provide a full-body or localized rolling massage.

Also, evaluation values can be derived from the output waveform, and these evaluation values can be weighted to provide more accurate identification of the patient's posture. The following is a description of one such example.

The following three aspects of the output waveform are used as evaluation values.

1. Average value M
2. Fluctuation width F=maximum value−minimum value
3. Waveform uniformity B=maximum value−minimum value/average value−minimum value These evaluation values are used in the following formula to calculate a closeness to the shoulder Ps.

$$Ps=K1*Ms/M+K2*F/Fs+K3*B/Bs$$

In this formula, Ms, Fs, and Bs are statistical averages of the evaluation values at the shoulder position, and K1,K2, and K3 are weighting coefficients for the evaluation values. One or two of the weighting coefficients K1,K2, or K3 can be set to 0.

Evaluation values are calculated based on the output waveform, and the shoulder closeness Ps is calculated. When this value exceeds a predetermined threshold value, it can be assumed that the massage position is at the shoulder. Similarly, for the back and hip, a closeness Pb to the back and a closeness Pw to the hip can be calculated using evaluation values, statistical averages of the evaluation values, and weighting coefficients. Also, the absolute values of these three evaluation values can be calculated for multiple body locations and can be stored in memory as the body characteristics of the patient.

In this embodiment, massage positions are identified as the shoulder, back, and hip, but this mechanism can be used to perform detection for just the shoulder. The detection of the shoulder position can be performed while the massage motor 51 is stopped. The massage unit 30 can be moved from the uppermost position to the lowermost position while measuring the output voltage from angle detecting means 70.

Figure 9:
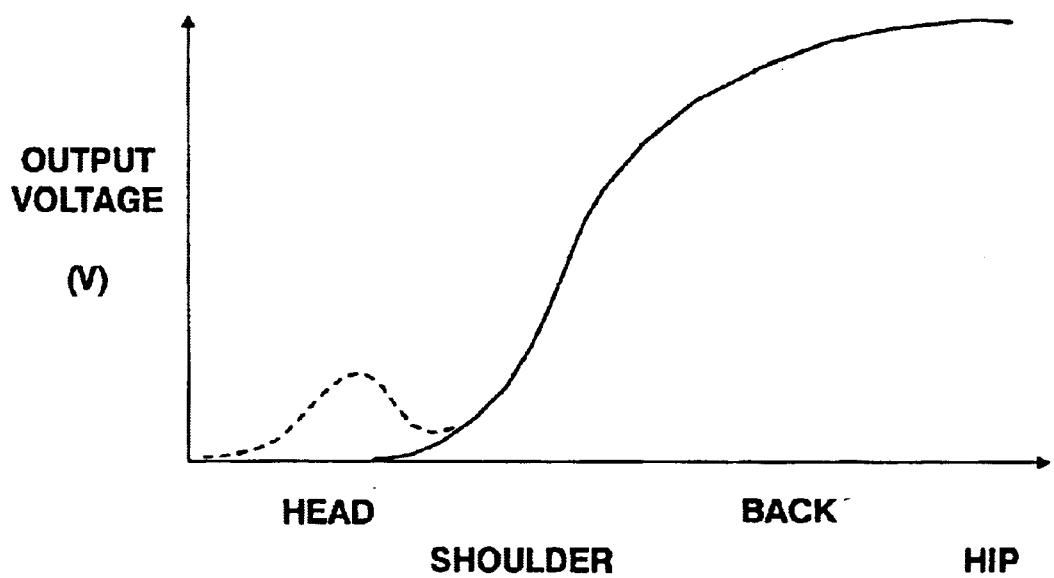
FIG. 9 is a graph showing the output voltage from angle detecting means during shoulder position detection.

The operations involved when the massage unit 30 is lowered while the treatment fingers 40, 40 are spread apart from each other will be described. Referring to FIG. 9, when the massage unit 30 is at the upper position of the backrest 13 as shown by the solid lines, i.e., when the massage balls 41 are not in contact with the patient, the therapeutic arms 42, 42 are tilted forward by the biasing from the spring 82. As a result, the output voltage from angle detecting means 70 is roughly 0, or minimum. The massage unit 30 is lowered and the upper massage balls 41 come into contact with the edge of the patient's shoulder. As the massage unit 30 is lowered after contact of the massage balls 41 with the shoulder, the therapeutic arms 42, 42 are raised to a roughly perpendicular state. This causes the magnetic core 72 to enter the coil 71. This produces a high output voltage from the angle detecting means 70.

Output voltage thresholds, inclines, and waveform characteristics for the shoulder position can be set up ahead of time so that comparison can be made with the output voltage from angle detecting means 70, thus allowing detection of the patient's shoulder position.

Since angle detecting means 70 is formed with the coil 71 and the magnetic core 72, detection can be performed in a non-contacting manner. Thus, detection of the patient's position can be provided at low cost while providing a longer mechanical and electronic lifespan.

Referring to FIG. 9, when detecting the shoulder position with the treatment fingers 40, 40 close to each other, the massage balls 41 come into contact with the patient's head before the shoulder, as indicated by the dashed lines. As a result, the therapeutic arms 42,42 rotate backward slightly, and output voltage is detected from angle detecting means 70. As the massage unit 30 is lowered further, the therapeutic arms 42, 42 are restored roughly to their forward tilting position near the neck, and the output voltage from angle detecting means 70 approaches zero. As the massage unit 30 is lowered further, the massage balls 41, 41 come into contact with the shoulder as described above, and subsequent operations are the same as in the example illustrated with solid lines in FIG. 9.

By setting up output voltage thresholds, inclines, and waveform characteristics for the shoulder position ahead of time as described above, the patient's shoulder position can be detected as described above even when the massage balls 41, 41 come into contact with the head first.

The description of the embodiment is provided for the purpose of illustrating the present invention and does not restrict or narrow the invention described in the claims. The elements of the present invention are not restricted to what is described in the above embodiment, and various changes may be made within the technical scope of the claims.

In the above embodiment, the therapeutic arms 42, 42 are connected to the massage shaft 52 by the pivot arms 43, 43 to move the massage balls 41, 41 toward and away from each other. However, the present invention is not restricted to this embodiment. For example, the present invention can be implemented in a massage chair wherein the massage balls 41, 41 are moved toward and away from each other by connecting the therapeutic arms 42, 42 directly to a massage shaft. In this case, either the coil 71 or the magnetic core 72 is attached to the therapeutic arm 42, 42, and the other element is attached to a section where there will be relative displacement when the therapeutic arms 42, 42 rotate.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A massage chair comprising:

a backrest on said chair;

a massage unit associated with said backrest;

means for permitting raising and lowered said massage unit along said backrest;

first and second therapeutic arms pivotably supported on first and second pivot arms, respectively, projecting forward from said backrest;

therapeutic fingers on said therapeutic arms;

massage balls on said therapeutic fingers;

means for driving said pivot arms in three dimensions to massage a patient with said massage balls; and angle detecting means for detecting an angle of said therapeutic arms relative to said pivot arms.

2. A massage chair according to claim 1 wherein said angle detecting means includes:

a coil disposed on one of said therapeutic arm and said pivot arm;

a magnetic core disposed on the other of said therapeutic arm and said pivot arm;

said core being moved into and out of said coil by a change in said angle.

3. A massage chair according to claim 2 wherein said coil is a cylinder and said magnetic core moves in said coil in a reciprocating manner.

4. A massage chair according to claim 1 further comprising:

a detection circuit;

said detection circuit including means for detecting a massage position on a body of a patient on which a massage operation is taking place; and said detection circuit being responsive to a position at which said massage balls contact said patient based on an angle change of said therapeutic arms relative to said pivot arms detected by said angle detecting means.

5. A massage chair according to claim 4 wherein said angle detecting means includes:

a coil disposed on one of said therapeutic arm and said pivot arm;

a magnetic core disposed on the other of said therapeutic arm and said pivot arm;

said core being moved into and out of said coil by a change in said angle.

6. A massage chair according to claim 5 wherein said detection circuit produces a voltage having an amplitude related to an inductance of said coil.

7. A massage chair according to claim 6 further comprising means for detecting a massage position at which said massage balls contact said patient.

8. A massage chair according to claim 7 wherein said means for detecting a massage position includes means for responding to a maximum value of a voltage waveform to detect a massage position at which said massage balls comes into contact with said patient.

9. A massage chair according to claim 6 wherein said detection circuit includes means for responding to an average value of a voltage waveform to detect a massage position at which said massage balls comes into contact with said patient.

10. A massage chair according to claim 6 wherein said detection circuit includes means for responding to a degree of uniformity of a voltage waveform to detect a massage position at which said massage balls comes into contact with said patient.

11. A massage chair according to claim 6 wherein;

said detection circuit detects data comprising at least two of a maximum value, an average value, and a degree of uniformity of a voltage waveform; and said means for determining a massage position at which said massage balls comes into contact with said patient based on said data detected by said detection circuit.

12. A massage chair comprising:

a backrest;

a massage unit in said backrest;

means for raising and lowering said massage unit in said backrest;

a pair of therapeutic arms on said massage unit projecting forward therefrom;

therapeutic fingers on said therapeutic arms;

massage balls on said therapeutic fingers;

means for moving said therapeutic arms in three dimensions whereby a patient receives a massage from said massage balls;

one of a coil of wire and a magnetic core disposed on said therapeutic arm;

the other of said coil of wire and said magnetic core being mounted on an element of said massage unit;

said coil and core being positioned so that said core moves in and out of said coil in response to a change in an angle between said therapeutic arm and said element; and angle detecting means for detecting said change in the angle between said therapeutic arm and said element.

13. A massage chair according to claim 12 wherein said coil is a cylinder and said magnetic core moves in said coil in a reciprocating manner.

* * * * *